United States Patent
Tsuchiya et al.

(10) Patent No.: US 6,434,509 B1
(45) Date of Patent: Aug. 13, 2002

(54) METHOD AND APPARATUS FOR MEASURING DISPLACEMENT OF OBJECT USING GPS

(75) Inventors: Atsushi Tsuchiya, Kamakura; Teruyuki Kato, Fujisawa; Yukihiro Terada, Osaka; Masao Kinoshita, Osaka; Hideshi Kakimoto, Osaka; Hiroshi Isshiki, Osaka, all of (JP)

(73) Assignee: Hitachi Zosen Corporation, Osaka (JP)

( * ) Notice: Subject to any disclaimer, the term of this patent is extended or adjusted under 35 U.S.C. 154(b) by 196 days.

(21) Appl. No.: 09/599,470

(22) Filed: Jun. 22, 2000

(30) Foreign Application Priority Data

Mar. 31, 2000 (JP) ........................................ 2000-096060

(51) Int. Cl.[7] .............................................. G01B 11/02
(52) U.S. Cl. ....................................... 702/158; 702/157
(58) Field of Search ................................ 702/127, 158, 702/159, 157; 701/213, 215, 301

(56) References Cited

U.S. PATENT DOCUMENTS 5,828,987 A * 10/1998 Tano et al. .................. 340/988
6,081,769 A * 6/2000 Curtis ...................... 246/122 R

* cited by examiner

Primary Examiner—John S. Hilten
Assistant Examiner—Stephen J. Cherry
(74) Attorney, Agent, or Firm—Fildes & Outland, P.C.

(57) ABSTRACT

Relative vector between an observation receiver located at an object and a reference receiver are divided into long period variation components not dependent on object displacements and short period variation components dependent on object displacements, and the short period variation component are represented by x, y and z axis components of unit vectors from the reference receiver toward the satellite. Then, carrier phases between at least three GPS satellites and the receivers are measured, and these measurement data are passed through a band pass filter to extract short period phase components corresponding to the short period variation components of the relative vectors. Next, at least three receiver to receiver single differences between the receivers and the GPS satellites are found for the short period phase components, and axial components of the short period variation components of the relative vectors are found by computation based on said at least three receiver to receiver single differences.

4 Claims, 4 Drawing Sheets

METHOD AND APPARATUS FOR MEASURING DISPLACEMENT OF OBJECT USING GPS

FIELD OF THE INVENTION

This invention relates to a displacement measuring method and displacement measuring apparatus capable of measuring displacements such as vibrations in a structure by installing a GPS receiver in the structure and detecting the position of that structure.

BACKGROUND OF THE INVENTION

The real-time kinematic positioning method (RTK method) is a conventional method for measuring vibration components with centimeter-order precision, while maintaining real-time characteristics, using a GPS (global positioning system).

This method determines three-dimensional coordinates of a measurement target location by determining a carrier phase at the target location while referencing measured values of carrier phases from a GPS at a reference point for which the longitude, latitude, and altitude are known beforehand, and measures vibration components using time changes in the determined coordinate values.

However, when the distance between a satellite and a receiver at the measurement target location is being found by the carrier phase, it is necessary to determine integer bias ambiguity, and, in order to find the integer bias ambiguity, voluminous computations need be executed, which constitutes a problem.

SUMMARY OF THE INVENTION

An object of the present invention is to provide a GPS-based object displacement measuring method and displacement measuring apparatus which do not require integer bias ambiguity computations.

In order to attain the object stated above, the GPS-based object displacement measuring method according to the present invention is a method in which displacements of an object are measured by measuring carrier phases of radio waves emitted from at least three GPS satellites with a reference receiver deployed at a prescribed location and a measurement receiver deployed at the object, comprising the steps of:

dividing relative vectors indicating the relative positions of the two receivers into long period variation components not dependent on object displacements and short period variation components dependent on object displacements;

representing at least the short period variation components by x-, y-, and z-axis components for each unit vector directed toward the satellites from the reference receiver;

extracting short period phase components corresponding to the short period variation components of the relative vectors by measuring the carrier phases between the receivers and said at least three GPS satellites and passing these measured data through a band pass filter;

finding at least three receiver to receiver single differences between the receivers and the GPS satellites; and computing the axial components for the short period variation components of the relative vectors based on said at least three receiver to receiver single differences.

In order to attain the object noted above, moreover, the GPS-based object displacement measuring apparatus according to the present invention is an apparatus in which displacements of an object are measured by measuring the carrier phases of radio waves emitted from at least three GPS satellites with a reference receiver deployed at a prescribed location and a measurement receiver deployed at the object, comprising:

a satellite angle measurement unit for receiving radio waves transmitted from the GPS satellites and measuring the elevations and azimuths of the satellites;

a carrier phase measurement unit for measuring the phases of carrier waves from the satellites;

a short period phase component extraction unit for passing the carrier phases measured by the carrier phase measurement unit through a band pass filter and extracting short period phase components that are time variation components;

a single difference computation unit for finding receiver to receiver single differences of the short period phase components extracted by the short period phase component extraction unit; and a short period variation component computation unit for inputting the elevations and azimuths from the satellite angle computation unit and the receiver to receiver single differences from the single difference computation unit, respectively, producing at least three equations, solving these equations, and computing short period variation components of relative vectors.

As based on the configuration of the displacement measuring method and displacement measuring apparatus described above, relative vectors between the reference receiver and the measurement receiver are divided into long period variation components not dependent on object displacements and short period variation components dependent on object displacements. Then attention is given only to the short period variation components directly related to the object displacement, and the axial components of the relative vectors are found by computation based on the receiver to receiver single differences of the short period phase components that are short period variation components (components that are not dependent on integer bias ambiguity or displacements in satellite orbit) of carrier phases between the two receivers and the GPS satellites, whereby object displacements can be measured without finding integer bias ambiguity.

In order further to attain the object stated above, another GPS-based object displacement measuring method according to the present invention is a method in which a displacement of an object is measured by measuring the carrier phases of radio waves emitted from at least three GPS satellites with a reference receiver deployed at a prescribed location and a measurement receiver deployed at the object; comprising the steps of:

dividing relative vectors indicating the relative positions of the two receivers into long period variation components not dependent on object displacements and short period variation components dependent on object displacements;

representing at least the short period variation components by x-, y-, and z-axis components for each unit vector directed toward the satellites from the reference receiver:

extracting short period phase components corresponding to the short period variation components of the relative vectors by measuring the carrier phases between the receivers and the at least three GPS satellites and passing the measured data through a band pass filter;

finding at least three receiver to receiver/satellite to satellite double differences between the receivers and the GPS satellites; and computing the axial components for the short period variation components of the relative vectors based on the at least three receiver to receiver/satellite to satellite double differences.

In order to further attain the object noted above, another GPS-based object displacement measuring apparatus according to the present invention is an apparatus in which a displacement of an object is measured by measuring the carrier phases of radio waves emitted from at least three GPS satellites with a reference receiver deployed at a prescribed location and a measurement receiver deployed at the object, comprising:

a satellite angle measurement unit for receiving radio waves transmitted from GPS satellites and measuring the elevations and azimuths of these satellites from data contained in the navigation messages thereof;

a carrier phase measurement unit for measuring the phases of carrier waves; a short period phase component extraction unit for passing the carrier phases measured by the carrier phase measurement unit through a band pass filter and extracting short period phase components that are time variation components;

a single difference computation unit for finding receiver to receiver single differences of the short period phase components extracted by the short period phase component extraction unit;

a double difference computation unit for finding receiver to receiver/satellite to satellite double differences of short period phase components that are satellite to satellite single differences of receiver to receiver single differences extracted by the single difference computation unit; and a short period variation component computation unit for inputting elevations and azimuths from the satellite angle computation unit and the receiver to receiver/satellite to satellite double differences from the double difference computation unit, producing at least three equations, solving these equations, and computing short period variation components of relative vectors.

As based on the configuration of the displacement measuring method and displacement measuring apparatus described above, relative vectors between the reference receiver and the measurement receiver are divided into long period variation components not dependent on object displacements and short period variation components dependent on object displacements. Then attention is given only to the short period variation components directly related to the object displacement, and the axial components of the relative vectors are found by computation based on the receiver to receiver/satellite to satellite double differences of the short period phase components that are short period variation components (components that are not dependent on integer bias ambiguity or fluctuations in satellite orbit) of carrier phases between the two receivers and the GPS satellites, whereby object displacements can be measured without finding integer bias ambiguity.

Various features and benefits of the present invention will be apparent from embodiments which will be described with reference to the attached drawings.

PREFERRED EMBODIMENTS

A GPS-based object displacement measuring method and displacement measuring apparatus according to a preferred first embodiment of the present invention are now described with reference to FIG. 1 and FIG. 2.

Figure 1:
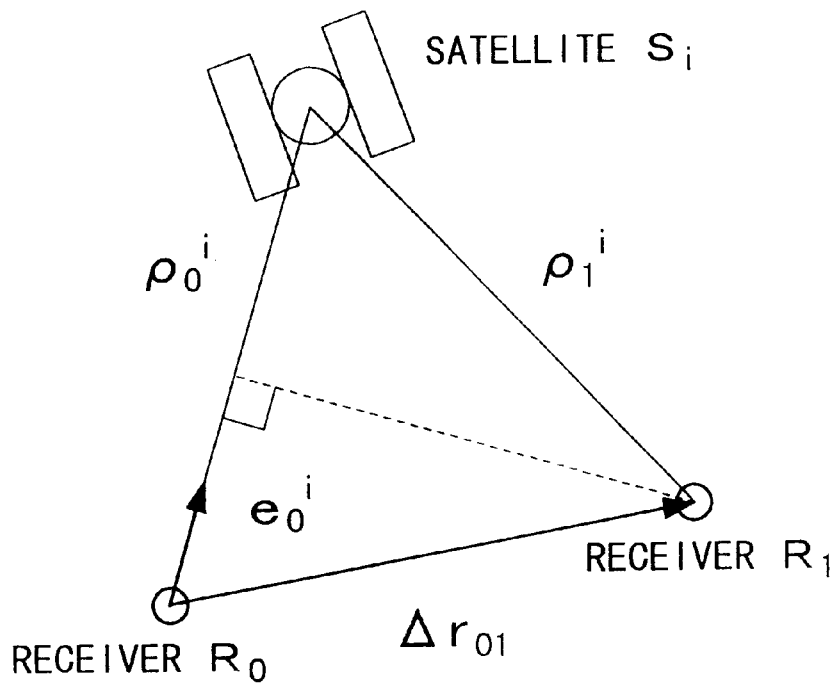
FIG. 1 is a diagram representing the positional relationship between a satellite and receivers for the purpose of describing a displacement measuring method according to a first embodiment of the present invention.
Figure 2:
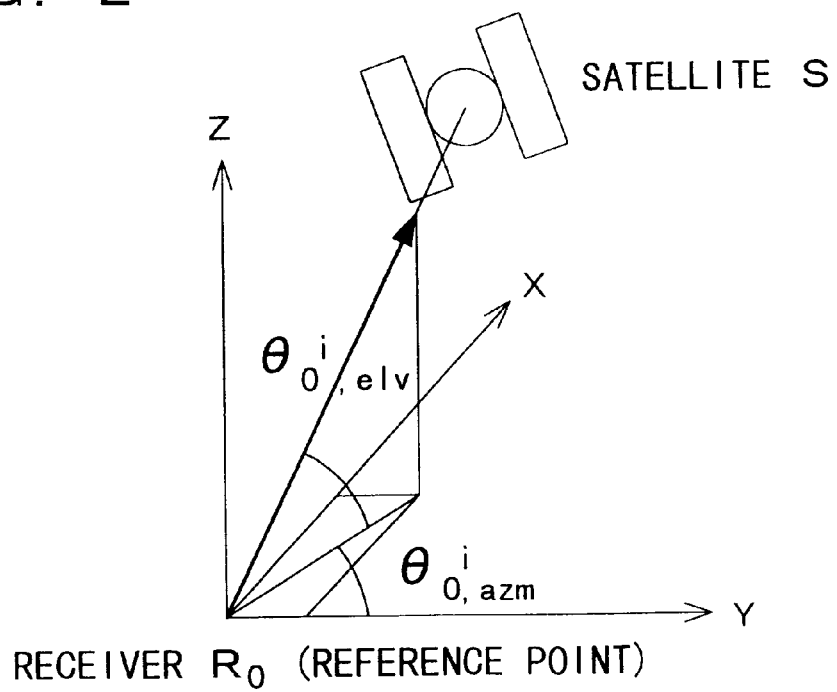
FIG. 2 is a diagram representing elevation and azimuth angles subtended by a satellite at a reference receiver for describing the same displacement measuring method of the present invention.

In FIG. 1 is diagrammed the positional relationship between a GPS satellite and a GPS receiver, while in FIG. 2 are diagrammed the elevation and azimuth of a GPS satellite at a reference receiver.

This displacement measuring method is one that uses a kinematic positioning method and is capable of measuring a displacement of an object on the order of several tens of hertz, or, in more concrete terms, the vibrations of architectural structures, the vibrations of mechanical structures, or fluctuations in the ocean surface.

Because this displacement measuring method uses a kinematic positioning method, moreover, when making such measurements, a reference receiver located at a reference point and an observation receiver that is an observation point located in an architectural structure, for example, are used. In those measurements, a relative vector that is the base line between those two geographic points is used. The position of each receiver actually indicates the position at which the receiving antenna is located.

In the first place, the principle of measurement according to an ordinary kinematic positioning method will be described based on FIG. 1.

The distance $\rho_1^i$ between a GPS satellite (hereinafter satellite) $S_i$ and an observation receiver $R_1$ is expressed as in formula (1) below.

$$\rho_1^i = \sqrt{(x_{rcv1} - x_{sat}^i)^2 + (y_{rcv1} - y_{sat}^i)^2 + (z_{rcv1} + z_{sat}^i)^2} \ldots \quad (1)$$

In formula (1), x, y, and z, respectively, are the x coordinate, y coordinate, and z coordinate in a geodetic coordinate system, while the subscript rcv indicates a receiver (with the numeral 1 indicating the observation receiver and 0 indicating the reference receiver), and sat indicates a satellite.

Here, after the integer bias ambiguity $N_1^i$ has been found, formula (2) below is established if the measurement error is small.

$$\rho_1^i \approx \phi_1^i + \overline{\phi}^i + \lambda N^i \quad (2)$$

In formula (2) above, φ represents the carrier phase as a distance, $\overline{\phi}^i$ represents the carrier phase, as a distance, from the time that the satellite begins transmitting a transmission signal until the time of observation, and $\lambda$ represents the wavelength of the carrier wave from the GPS satellite.

With a kinematic positioning method, in order to eliminate errors originating in the satellite and propagation path, relative position measurements are made using a reference receiver $R_0$ located at a reference point of known position, as diagrammed in FIG. 1.

That is, the distance $\pi_1^i$ between the satellite $S_i$ and the reference receiver $R_0$ is expressed by formula (3) below.

$$\rho_0^i = \sqrt{(x_{rcv0} - x_{sat}^i)^2 + (y_{rcv0} - y_{sat}^i)^2 + (z_{rcv0} + z_{sat}^i)^2} \quad \ldots \quad (3)$$

Here, when the receiver to receiver single difference ($\Delta \rho$) is taken, formula (4) below is obtained.

$$(\Delta \rho)_{01}^i = \rho_o^i - \rho_1^i \quad (4)$$

$$= \sqrt{(x_{rcv0} - x_{sat}^i)^2 + (y_{rcv0} - y_{sat}^i)^2 + (z_{rcv0} - z_{sat}^i)^2} -$$

$$\sqrt{(x_{rcv1} - x_{sat}^i)^2 + (y_{rcv1} - y_{sat}^i)^2 + (z_{rcv1} - z_{sat}^i)^2}$$

However, when the receiver-induced error is small, or when the integer bias ambiguity N receiver to receiver single difference $(\Delta N)_{01}^i = N_0^i - N_1^i$ is found, the approximation given in formula (5) below is established.

$$(\Delta \rho)_{01}^i \approx (\Delta \phi)_{01}^i + \lambda (\Delta N)_{01}^i \quad (5)$$

That is, when three or more satellites are observed by two receivers, and the receiver to receiver single difference $(\Delta \phi)_{01}^i$ of the carrier phase is found, the coordinates ($x_{rcv1}$, $y_{rcv1}$, $z_{rcv}$) of the observation receiver $R_1$ can be determined. The $\phi^i$ term is a term common to $\rho_0^i$ and $\rho_1^i$, wherefore it will disappear by taking the receiver to receiver single difference.

The positional relationships between the satellite S, the reference receiver $R_0$, and the observation receiver $R_1$ are as diagrammed in FIG. 2, it should be noted. If the distance between the reference point and the observation point should not be too large, the right side of formula (3) above can be made simpler.

Specifically, if the relative positional vector between the reference receiver $R_0$ and the observation receiver $R_1$ is made $\Delta r_{01} = (\Delta x_{01}, \Delta y_{01}, \Delta z_{01})$, then formula (6) below is established.

$$(x_{rcv1}, y_{rcv1}, z_{rcv1}) = (x_{rcv0} + \Delta x_{01}, y_{rcv0} + \Delta y_{01}, z_{rcv0} + \Delta z_{01}) \quad (6)$$

When formula (6) is substituted in formula (1) and the form thereof is altered, formula (7) below is obtained.

Here, $e_0^i = (e_{0,x}^i, e_{0,y}^i, e_{0,z}^i)$ is a unit vector from the reference receiver $R_0$ toward the satellite $S_i$, and the x axis, y axis, and z axis thereof, as diagrammed in FIG. 2, are represented as in formula (8) below using the elevation $\theta_{0,elv}^i$ and azimuth $\theta_{0,azm}^i$ of the satellite $S_i$ as seen from the reference receiver $R_0$.

$$(e_{0,x}^i, e_{0,y}^i, e_{0,z}^i) = (\cos \theta_{0,elv}^i \sin \theta_{0,azm}^i, \cos \theta_{0,elv}^i \cos \theta_{0,azm}^i, \sin \theta_{0,elv}^i) \quad (8)$$

The altitude of the satellite is extremely high at 20,000 km. Ordinarily, therefore, the elevation $\theta_{elv}^i$ and the azimuth $\theta_{azm}^i$ can be found with extreme accuracy even using a dummy distance.

Using formula (7), the right side of formula (5) above, which expresses the receiver to receiver single difference, becomes formula (9) below.

$$(\Delta \rho)_{01}^i = \rho_0^i - \rho_1^i \quad (9)$$

$$\approx e_{0,x}^i \Delta x_{01} + e_{0,y}^i \Delta x_{01} + e_{0,z}^i \Delta z_{01} = c_0^i \cdot \Delta r_{01}$$

However, the absolute coordinates for the reference receiver $R_0$ are not needed to find the relative displacement vector $\Delta r_{01}$ between the two receivers $R_0$ and $R_1$, and the reference receiver $R_0$ may even move.

Furthermore, when the satellite to satellite single difference of formula (5), that is, the receiver to receiver/satellite to satellite double difference $(\nabla \cdot)^{ij} = (\cdot)^i - (\cdot)^j$, is taken, formula (10) below is obtained.

$$(\nabla \Delta \rho)_{01}^{ij} \approx (\nabla \Delta \phi)_{01}^{ij} + \lambda (\nabla \Delta N)_{01}^{ij} \quad (10)$$

And, when formula (4) is used here, formula (11) below is obtained.

$$(\nabla \Delta \rho)_{01}^{ij} = (\Delta \rho)_{01}^i - (\Delta \rho)_{01}^j = \rho_0^i - \rho_1^i - \rho_0^j + \rho_1^j \quad (11)$$

$$= \sqrt{(x_{rcv0} - x_{sat}^i)^2 + (y_{rcv0} - y_{sat}^i)^2 + (z_{rcv0} - z_{sat}^i)^2} -$$

$$\sqrt{(x_{rcv1} - x_{sat}^i)^2 + (y_{rcv1} - y_{sat}^i)^2 + (z_{rcv1} - z_{sat}^i)^2} -$$

$$\sqrt{(x_{rcv0} - x_{sat}^j)^2 + (y_{rcv0} - y_{sat}^j)^2 + (z_{rcv0} - z_{sat}^j)^2} +$$

$$\sqrt{(x_{rcv1} - x_{sat}^j)^2 + (y_{rcv1} - y_{sat}^j)^2 + (z_{rcv1} - z_{sat}^j)^2}$$

Now, if formula (10) is established, four or more satellites are observed with two receivers, and three or more $(\nabla \Delta \phi)_{01}^{ij}$ are found, or if $(\nabla \Delta N)_{01}^{ij}$ is found by some method or other, then the coordinates ($x_{rcv1}$, $y_{rcv1}$, $z_{rcv1}$) of the observation receiver can be determined.

When the distance between the reference receiver and the observation receiver is not too great, the approximation in $$\rho_1^i = \sqrt{(x_{rcv0} - x_{sat}^i + \Delta x_{01}^2) + (y_{rcv0} - y_{sat}^i + \Delta y_{01})^2 + (z_{rcv0} - z_{sat}^i + \Delta z_{01})^2} \quad (7)$$

$$\approx \sqrt{\begin{array}{l}(x_{rcv0} - x_{sat}^i)^2 + (y_{rcv0} - y_{sat}^i)^2 + (z_{rcv0} - z_{sat}^i)^2 + \\ 2(x_{rcv0} - x_{sat}^i)\Delta x_{01} + 2(y_{rcv0} - y_{sat}^i)\Delta y_{01} + 2(z_{rcv0} - z_{sat}^i)\Delta z_{01}\end{array}}$$

$$\approx \rho_0^i + \frac{(x_{rcv0} - x_{sat}^i)}{\rho_0^i}\Delta x_{01} + \frac{(y_{rcv0} - y_{sat}^i)}{\rho_0^i}\Delta y_{01} + \frac{(z_{rcv0} - z_{sat}^i)}{\rho_0^i}\Delta z_{01}$$

$$\approx \rho_0^i - e_{0,x}^i \Delta x_{01} - e_{0,y}^i \Delta x_{01} - e_{0,z}^i \Delta z_{01}$$

formula (12) below is obtained by substituting formula (9) in formula (11).

$$(\nabla \Delta \rho)_{01}^{ij} = \rho_0^i - \rho_1^i - \rho_o^j + \rho_1^j \qquad (12)$$
$$\approx (e_{0,x}^i - e_{0,x}^j)\Delta x_{01} + (e_{0,y}^i - e_{0,y}^j)\Delta x_{01} + (e_{0,z}^i - e_{0,z}^j)\Delta z_{01}$$
$$= (c_0^i - c_0^j) \cdot \Delta r_{01}$$

In order to find the variation component in the observation receiver position by a real-time kinematic positioning method, the algorithm noted above is executed in real time to find $\Delta r_{01}$, then, from that and the position of the reference receiver, the three-dimensional coordinate position of the observation receiver is found, and the time change therein is found.

It should be noted, however, that positional measurements by this method presuppose the ability to determine the integer bias ambiguity $N_\alpha^i$, and voluminous computations must be executed to find that.

In the present invention, receiver position variation components can be found without finding this integer bias ambiguity.

A method for measuring displacements in the observation receiver, that is, displacements of an object such as an architectural structure, without using the integer bias ambiguity, is now described.

First, the relative vector $\Delta r$ (called the relative position vector or relative displacement vector) expressed in formula (13) below between the reference receiver and the observation receiver is divided into a long period variation component $\Delta \bar{r}$ that is not dependent on object (observation point) displacements and a short period variation component $\Delta \tilde{r}$ that is dependent on object displacements. When these components are expressed, the result is formula (16) below.

$$\Delta r_{01}(t) = (\Delta x_{01}(t), \Delta y_{01}(t), \Delta z_{01}(t)) \qquad (13)$$
$$\Delta \bar{r}_{01,0}(t) = (\Delta \bar{x}_{01}(t), \Delta \bar{y}_{01}(t), \Delta \bar{z}_{01}(t)) \qquad (14)$$
$$\Delta \tilde{r}_{01}(t) = (\Delta \tilde{x}_{01}(t), \Delta \tilde{y}_{01}(t), \Delta \tilde{z}_{01}(t)) \qquad (15)$$

$$\left. \begin{array}{l} \Delta x_{01}(t) = \Delta \bar{x}_{01}(t) + \Delta \tilde{x}_{01}(t) \\ \Delta y_{01}(t) = \Delta \bar{y}_{01}(t) + \Delta \tilde{y}_{01}(t) \\ \Delta z_{01}(t) = \Delta \bar{z}_{01}(t) + \Delta \tilde{z}_{01}(t) \end{array} \right\} \qquad (16)$$

When formula (16) above is substituted in formula (9) for finding the receiver to receiver single difference for the distance $\rho$, formula (17) below is obtained.

$$(\Delta \rho)_{01}^i \approx e_{0,x}^i \Delta x_{01} + e_{0,y}^i \Delta y_{01} + e_{0,z}^i \Delta z_{01} \qquad (17)$$
$$= e_{0,x}^i \Delta \bar{x}_{01}(t) + e_{0,y}^i \Delta \bar{y}_{01}(t) + e_{0,z}^i \Delta \bar{z}_{01}(t) +$$
$$e_{0,x}^i \Delta \tilde{x}_{01}(t) + e_{0,y}^i \Delta \tilde{y}_{01}(t) + e_{0,z}^i \Delta \tilde{z}_{01}(t)$$

When the short period variation component of $(\Delta \rho)_{01}^i$ is made $(\Delta \rho)_{01}^i(t)$, formula (18) below is derived.

$$(\Delta \rho)_{01}^i(t) = e_{0,x}^i \Delta \tilde{x}_{01}(t) + e_{0,y}^i \Delta \tilde{y}_{01}(t) + e_{0,z}^i \Delta \tilde{z}_{01}(t) \qquad (18)$$

When the satellite-induced error is small, if the short period phase component that is the short period variation component of the carrier phase receiver to receiver single difference $(\Delta \phi)_{01}^i$ is made $(\Delta \phi)_{01}^i(t)$, then $(\Delta N)_1^i$ will not fluctuate over time, which is to say that this is a long period variation component that is not dependent on object displacements, wherefore formula (19) below is established.

$$(\Delta \rho)_{01}^i(t) \approx (\Delta \phi)_{01}^i(t) \qquad (19)$$

Accordingly, if three or more short period phase components $(\Delta \phi)_{01}^i(t)$ from information from three or more satellites can be obtained, then three formulas (18) can be obtained, and it becomes possible to determine the relative vector short period variation component $\Delta \tilde{r}_{01}(t) = (\Delta \tilde{x}_{01}(t), \Delta \tilde{y}_{01}(t), \Delta \tilde{z}_{01}(t))$.

This component of the carrier phase that fluctuates over time, that is, the short period phase components $\phi \alpha^i(t)$ (where $\alpha = 0, 1$) that is dependent on object displacements, can be found by applying a prescribed band pass filter to the raw observation value $\phi \alpha^i$.

That is, displacements due to a displacement of an object such as an architectural structure wherein an observation receiver is deployed can be measured on the basis of the short period phase component $\phi$ that is the time variation component of the carrier phase that has been passed through the band pass filter.

Figure 3:
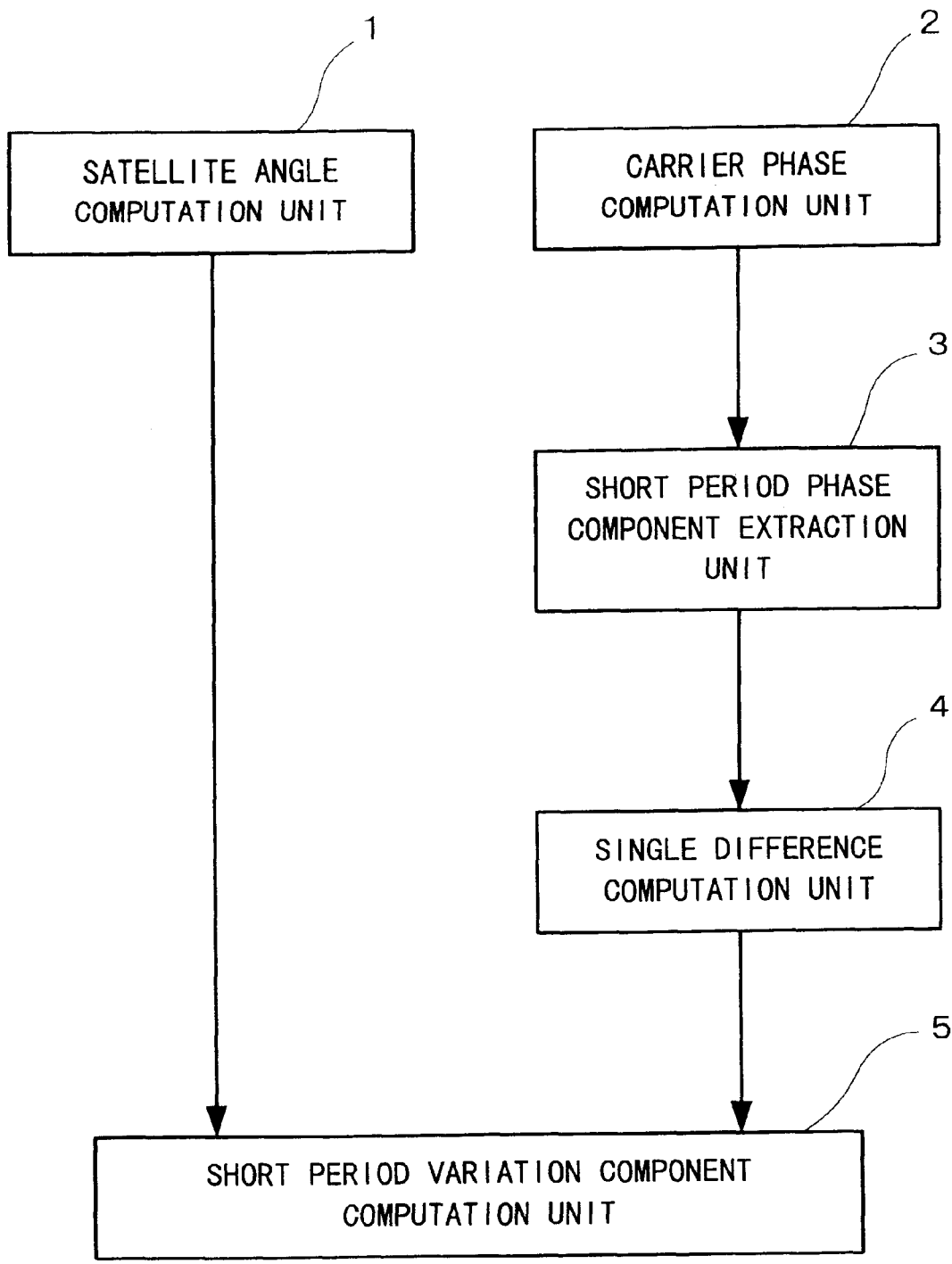
FIG. 3 is a block diagram representing in simplified form a configuration of a displacement measuring apparatus according to the first embodiment of the present invention.

The overall configuration of a first object displacement measuring apparatus capable of effecting the measurement method described in the foregoing is now described with reference to FIG. 2 and FIG. 3.

This displacement measuring apparatus comprises a satellite angle measurement unit 1 for receiving radio waves transmitted from GPS satellites and measuring the elevation $\theta_{elv}$ and the azimuth $\theta_{azm}$ from data contained in the navigation messages thereof, a carrier phase measurement unit 2 for measuring the carrier phase (phase distance), a short period phase component extraction unit 3 for passing the carrier phase $\phi$ measured by the carrier phase measurement unit 2 through a band pass filter and extracting the short period phase component $\phi$ that is the time variation component, a single difference computation unit 4 for finding the receiver to receiver single difference $\Delta \phi$ of the short period phase component $\phi$ extracted by the short period phase component extraction unit 3, and a short period variation component computation unit 5 for inputting the elevation $\theta_{elv}$ and azimuth $\theta_{azm}$ from the satellite angle measurement unit 1 and the receiver to receiver single difference $\Delta \phi$ from the single difference computation unit 4, respectively, producing at least three equations, solving the simultaneous equations, and computing the short period variation component $\Delta \tilde{r}$ of the relative vector $\Delta r$.

As based on the first displacement measuring method and displacement measuring apparatus described in the foregoing, the relative vector between the reference receiver and the observation receiver is divided into a long period variation component that is not dependent on object displacements and a short period variation component that is dependent on object displacements. Then attention is given only to the short period variation component that directly relates to an object displacement, and provision is made for finding the axial components of the relative vector by computation based on the receiver to receiver single difference of the short period phase component that is the short period variation component (a component which is not dependent on integer bias ambiguity or fluctuations in the satellite orbit) of the carrier phase between the two receivers and the GPS satellite(s). Hence displacement of the object can be measured without finding the integer bias ambiguity.

A GPS-based object displacement measuring method and displacement measuring apparatus relating to a second preferred embodiment of the present invention are now described with reference to FIG. 4.

Figure 4:
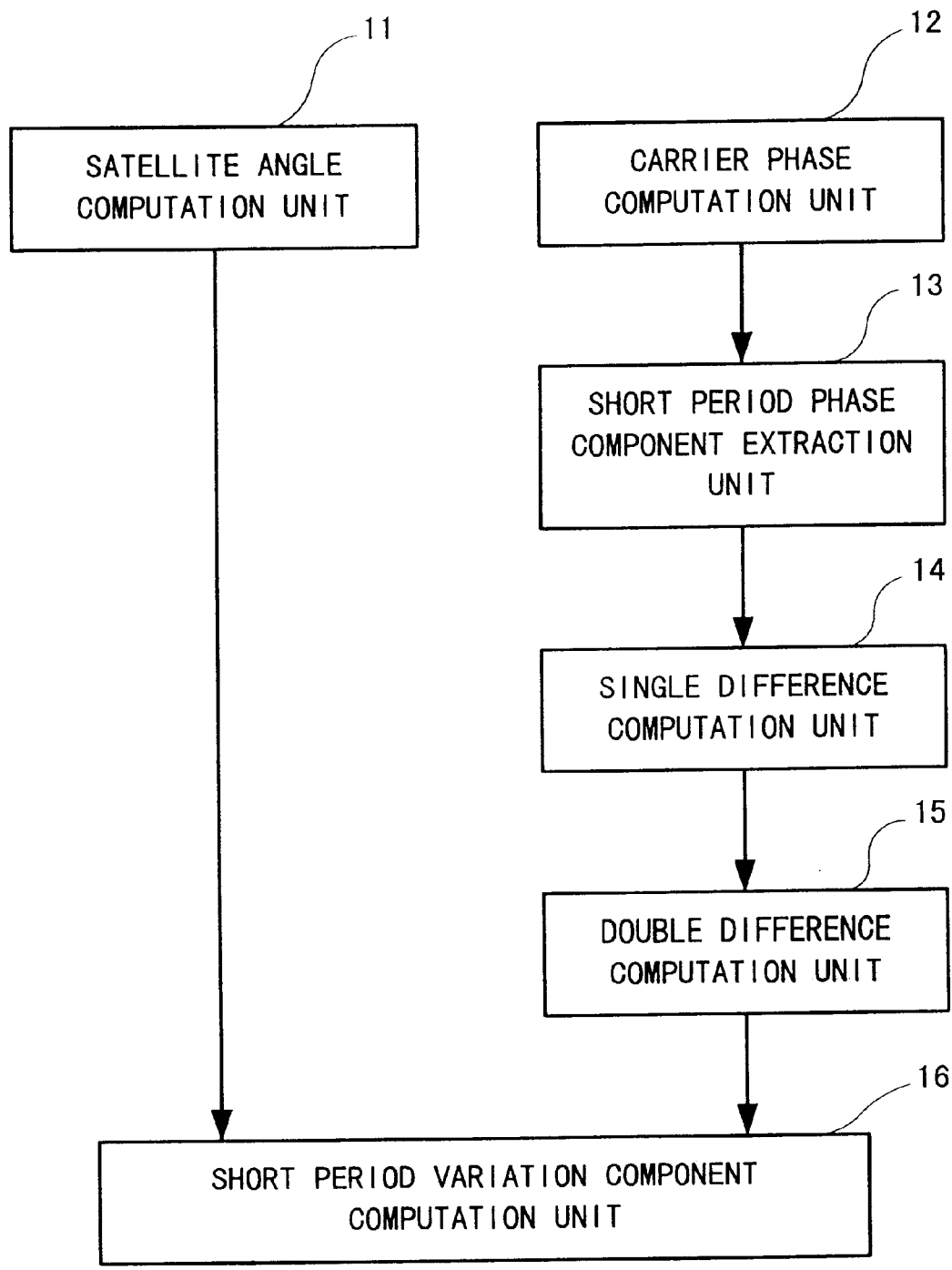
FIG. 4 is a block diagram representing in simplified form a configuration of a displacement measuring apparatus according to a second embodiment of the present invention.

FIG. 4 is a block diagram of the overall configuration of the displacement measuring apparatus.

In the object displacement measuring method relating to the first embodiment described earlier, provision is made for finding the short period variation component of the relative vector based on the receiver to receiver single difference of the short period phase component that is the short period variation component of the carrier phase. In the object displacement measuring method and displacement measuring apparatus of this second embodiment, however, by employing the receiver to receiver/satellite to satellite double difference of the short period phase component, provision is made for finding the short period variation component of the relative vector more precisely.

More specifically, when the receiver to receiver/satellite to satellite double difference of formulas (18) and (19) explained in the first embodiment is taken, formula (20) below is derived.

$$(\nabla \Delta \tilde{\phi})_{01}^{ij}(t) = (\Delta \tilde{\phi})_{01}^{i}(t) - (\Delta \tilde{\phi})_{01}^{j}(t) \quad (20)$$
$$\approx (\nabla \Delta \tilde{\rho})_{01}^{ij}(t) = (\Delta \tilde{\rho})_{01}^{i}(t) - (\Delta \tilde{\rho})_{01}^{j}(t)$$
$$= (e_{0,x}^{i} - e_{0,x}^{j})\Delta \tilde{x}_{01}(t) + (e_{0,y}^{i} - e_{0,y}^{j})\Delta \tilde{y}_{01}(t) +$$
$$(e_{0,z}^{i} - e_{0,z}^{j})\Delta \tilde{z}_{01}(t)$$

Accordingly, by producing receiver to receiver/satellite to satellite double differences ($\nabla \Delta \phi_{01}^{ij}$(t)) of three or more short period phase components from information from four or more satellites, and solving the simultaneous equations created by the leftmost and rightmost sides of formula (20), the short period variation component $\Delta \tilde{r}_{01}(t) = (\Delta \tilde{x}_{01}(t), \Delta \tilde{y}_{01}(t), \Delta \tilde{z}_{01}(t))$ of the relative vector can be determined.

In other words, the short period variation component $\Delta \tilde{r}_{01}(t)$ for the observation receiver $R_1$ can be found without using the integer bias ambiguity.

This second displacement measuring apparatus, as diagrammed in FIG. 4, comprises a satellite angle measurement unit 11 for receiving radio waves transmitted from GPS satellites and measuring the elevation $\theta_{elv}$ and the azimuth $\theta_{azm}$ from data contained in the navigation messages thereof, a carrier phase measurement unit 12 for measuring the carrier phase (phase distance) $\phi$, a short period phase component extraction unit 13 for passing the carrier phase $\phi$ measured by the carrier phase measurement unit 12 through a band pass filter and extracting the short period phase component $\tilde{\phi}$ that is the time variation component, a single difference computation unit 14 for finding the receiver to receiver single difference $\Delta \tilde{\phi}$ of the short period phase component $\tilde{\phi}$ extracted by the short period phase component extraction unit 13, a double difference computation unit 15 for finding the satellite to satellite differential $\Delta \tilde{\phi}$ of the receiver to receiver single difference extracted by the single difference computation unit 14, that is, the receiver to receiver/satellite to satellite double difference $\nabla \Delta \tilde{\phi}$ of the short period phase component $\tilde{\phi}$, and a short period variation component computation unit 16 for inputting the elevation $\theta_{elv}$ and azimuth $\theta_{azm}$ from the satellite angle measurement unit 11 and the receiver to receiver/satellite to satellite double difference $\nabla \Delta \tilde{\phi}$ from the double difference computation unit 15, producing at least three equations, solving the simultaneous equations, and computing the short period variation component $\Delta \tilde{r}$ of the relative vector $\Delta r$.

Figure 5:
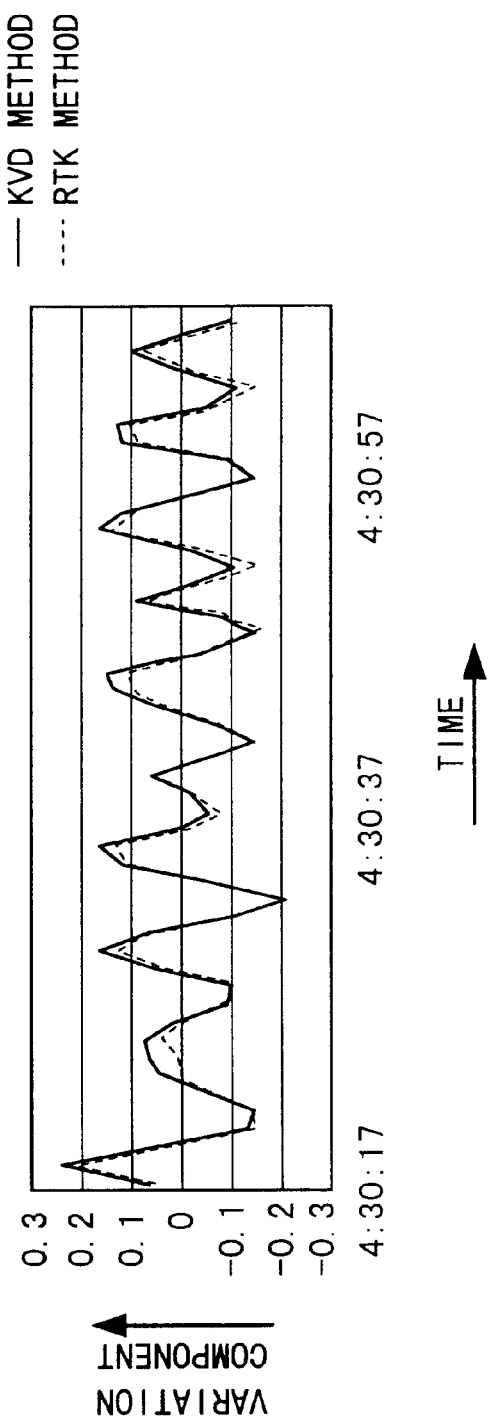
FIG. 5 is a graph which compares variation component measurement values made by a displacement measuring method according to the second embodiment and by a real-time kinematic positioning method.

In FIG. 5, the computation results of variation components in the vertical direction found by the KVD (Kinematics for Precise Variance Detection) method that is the measuring method of the present invention based on formula (20) when four satellites are used are compared against the results found by the real-time kinematic positioning method (RTK method).

It will be seen from FIG. 5 that the results of measurements made by the KVD method or the measuring method relating to the present invention and the results by the real-time kinematic positioning method (RTK method) are substantially the same.

In this second embodiment also, as in the first embodiment, the relative vector between the reference receiver and the observation receiver is divided into a long period variation component that is not dependent on object displacements and a short period variation component that is dependent on object displacements. Then attention is given only to the short period variation component that directly relates to the object displacement, and provision is made for finding the axial components of the relative vector by computation based on the receiver to receiver/satellite to satellite double difference of the short period phase component that is the short period variation component (a component which is not dependent on integer bias ambiguity or fluctuations in the satellite orbit) of the carrier phase between the two receivers and the GPS satellite(s). Hence the object displacements can be measured without finding the integer bias ambiguity.

What is claimed is:

1. An object displacement measuring method for measuring a displacement of an object by measuring carrier phases of radio waves emitted from at least three GPS satellites with a reference receiver deployed at a prescribed location and a measurement receiver deployed at the object, comprising the steps of:

dividing relative vectors indicating relative positions of said two receivers into long period variation components not dependent on object displacements and short period variation components dependent on object displacements;

representing at least said short period variation components by x-, y-, and z-axis components of unit vectors directed toward said satellites from said reference receiver:

extracting short period phase components corresponding to said short period variation components of said relative vectors by measuring carrier phases between said receivers and said at least three GPS satellites and passing these measured data through a band pass filter;

finding at least three receiver to receiver single differences between said receivers and said GPS satellites; and computing axial components for said short period variation components of said relative vectors based on said at least three receiver to receiver single differences.

2. An object displacement measuring apparatus for measuring a displacement of an object by measuring carrier phases of radio waves emitted from at least three GPS satellites with a reference receiver deployed at a prescribed location and a measurement receiver deployed at the object, comprising:

a satellite angle measurement unit for receiving radio waves transmitted from the GPS satellites and measuring elevations and azimuths of the satellites;

a carrier phase measurement unit for measuring phases of carrier waves from the satellites;

a short period phase component extraction unit for passing the carrier phases measured by said carrier phase measurement unit through a band pass filter and extracting short period phase components that are time variation components;

a single difference computation unit for finding receiver to receiver single differences of said short period phase components extracted by said short period phase component extraction unit; and a short period variation component computation unit for receiving said elevations and azimuths from said satellite angle measurement unit and said receiver to receiver single differences from said single difference computation unit, respectively, producing at least three equations, solving these equations, and computing short period variation components of relative vectors.

3. An object displacement measuring method for measuring a displacement of an object by measuring carrier phases of radio waves emitted from at least three GPS satellites with a reference receiver deployed at a prescribed location and a measurement receiver deployed at the object, comprising the steps of:

dividing relative vectors indicating relative positions of said two receivers into long period variation components not dependent on object displacements and short period variation component components dependent on object displacements;

representing at least said short period variation components by x-, y-, and z-axis components of unit vectors directed toward said satellites from said reference receiver:

extracting short period phase components corresponding to said short period variation components of said relative vectors by measuring carrier phases between said receivers and said at least three GPS satellites and passing these measured data through a band pass filter;

finding at least three receiver to receiver/satellite to satellite double differences between said receivers and said GPS satellites; and computing axial components for said short period variation components of said relative vectors based on said at least three receiver to receiver/satellite to satellite double differences.

4. An object displacement measuring apparatus for measuring a displacement of an object by measuring carrier phases of radio waves emitted from at least three GPS satellites with a reference receiver deployed at a prescribed location and a measurement receiver deployed at the object, comprising:

a satellite angle measurement unit for receiving radio waves transmitted from GPS satellites and measuring elevations and azimuths of these satellites from data contained in navigation messages thereof;

a carrier phase measurement unit for measuring phases of carrier waves;

a short period phase component extraction unit for passing carrier phases measured by said carrier phase measurement unit through a band pass filter and extracting short period phase components that are time variation components;

a single difference computation unit for finding receiver to receiver single differences of said short period phase components extracted by said short period phase component extraction unit;

a double difference computation unit for finding receiver to receiver/satellite to satellite double differences of short period phase components that are satellite to satellite single differences of said receiver to receiver single differences extracted by said single difference computation unit; and a short period variation component computation unit for receiving said elevations and azimuths from said satellite angle computation unit and said receiver to receiver/satellite to satellite double differences from said double difference computation unit, producing at least three equations, solving these equations, and computing short period variation components of relative vectors.

* * * * *